United States Patent
Tabor et al.

(10) Patent No.: US 10,171,193 B2
(45) Date of Patent: Jan. 1, 2019

(54) FRACTIONAL MULTIPLEXING OF SERIAL ATTACHED SMALL COMPUTER SYSTEM INTERFACE LINKS

(71) Applicant: Microsemi Solutions (U.S.), Inc., Aliso Viejo, CA (US)

(72) Inventors: Gregory Arthur Tabor, Colorado Springs, CO (US); John Matthew Adams, Colorado Springs, CO (US); Keith Graham Shaw, Port Coquitlam (CA); Larrie Simon Carr, Kelowna (CA); Salman Ghufran, Granite Bay, CA (US)

(73) Assignee: Microsemi Solutions (U.S.), Inc., Aliso Viejo, CA (US)

(*) Notice: Subject to any disclaimer, the term of this patent is extended or adjusted under 35 U.S.C. 154(b) by 43 days.

(21) Appl. No.: 15/418,201

(22) Filed: Jan. 27, 2017

(65) Prior Publication Data
US 2018/0219641 A1    Aug. 2, 2018

Related U.S. Application Data

(60) Provisional application No. 62/288,677, filed on Jan. 29, 2016.

(51) Int. Cl.
*H04J 3/16* (2006.01)
*H04L 12/863* (2013.01)

(52) U.S. Cl.
CPC .......... *H04J 3/1694* (2013.01); *H04L 47/623* (2013.01); *H04L 47/626* (2013.01)

(58) Field of Classification Search
CPC ..... H04L 47/623; H04L 47/626; H04J 3/1694
See application file for complete search history.

(56) References Cited

U.S. PATENT DOCUMENTS 5,838,681 A    11/1998  Bonomi et al.
7,913,037 B2 *  3/2011  Nakajima ............. G06F 3/0607
                                                           709/223

(Continued)

FOREIGN PATENT DOCUMENTS

EP    1975771 A2    10/2008
EP    2280351 A1     2/2011

OTHER PUBLICATIONS

"05-381r7 SAS-2 Multiplexing", T10 Technical Committee, Nov. 2006, 101 Pages.

(Continued)

*Primary Examiner* — Rasheed Gidado
(74) *Attorney, Agent, or Firm* — Leber IP Law; Shelly M. Fujikawa

(57) ABSTRACT

Methods, devices, and systems relating to Serial Attached SCSI (SAS) storage interconnect technology are provided. An SAS serial connection is established between an SAS initiator and an SAS expander over a physical link for communications between the SAS initiator and a plurality of target devices. The plurality of target devices is in communication with the SAS expander. SAS packets associated with each of the plurality of target devices are dynamically multiplexed and transmitted over the single SAS serial connection. Each SAS packet comprises one or more information bits indicating the target device with which the SAS packet is associated. The dynamically multiplexed SAS packets transmitted over the SAS connection may comprise SAS packets associated with at least two target devices having different maximum physical link rates. A result may be improved bandwidth utilization of the physical link when legacy SAS target devices with slower physical link rates are utilized.

15 Claims, 11 Drawing Sheets

(56) References Cited

U.S. PATENT DOCUMENTS

| | | | |
|---|---|---|---|
| 8,089,902 B1* | 1/2012 | Liao | H04L 49/55 370/254 |
| 2006/0039406 A1* | 2/2006 | Day | H04L 67/1097 370/469 |
| 2006/0047908 A1 | 3/2006 | Chikusa et al. | |
| 2006/0101171 A1* | 5/2006 | Grieff | G06F 13/387 710/36 |
| 2007/0005838 A1 | 1/2007 | Chang et al. | |
| 2009/0168654 A1* | 7/2009 | Mies | H04L 43/12 370/241 |
| 2010/0215041 A1* | 8/2010 | Petty | H04L 12/40013 370/392 |
| 2011/0022736 A1 | 1/2011 | Uddenberg et al. | |
| 2014/0115418 A1* | 4/2014 | Raghavan | G06F 11/1004 714/758 |
| 2014/0341231 A1* | 11/2014 | Henry | H04J 3/047 370/442 |

OTHER PUBLICATIONS

"Information Technology—SAS Protocol Layer-4 (SPL-4)", Working Draft Project American National Standard, T10/BSR INCITS 538, Revision 11, Jan. 12, 2017, 1052 Pages.

International Patent Application No. PCT/US2017/015369, International Search Report dated Apr. 6, 2017.

Penokie., "Working Draft Project AmericanNational T10/BSRINCITS538 StandardInformation technology—SAS Protocol Layer-4 (SPL-4)," Nov. 2015, XP055359801, Internet Retrieved from the Internet : URL:http://www.t10.org/ [retrieved on Mar. 29, 2017] paragraph [5.20]; figure 124.

\* cited by examiner

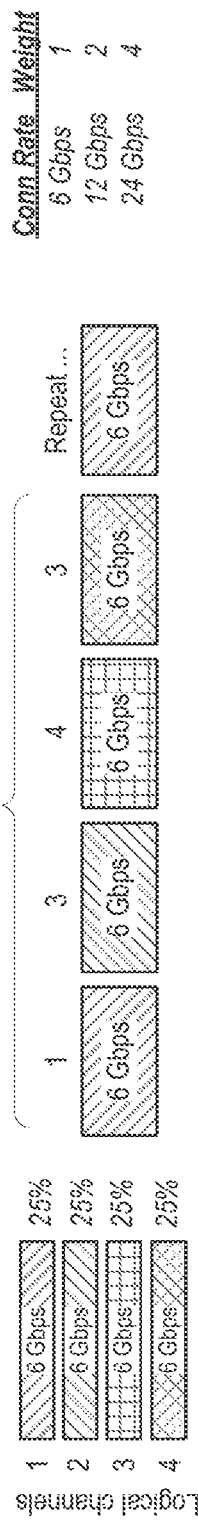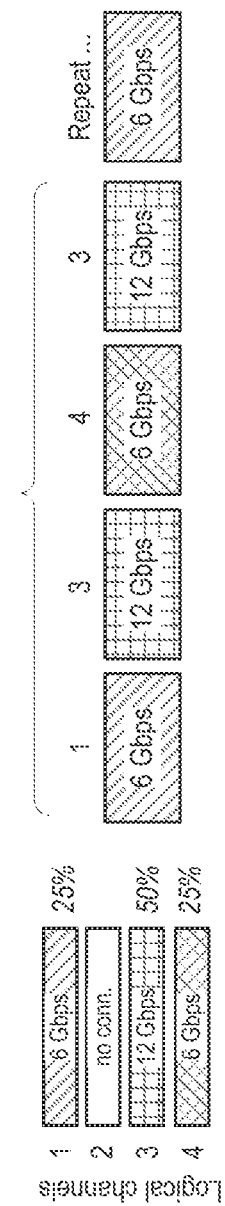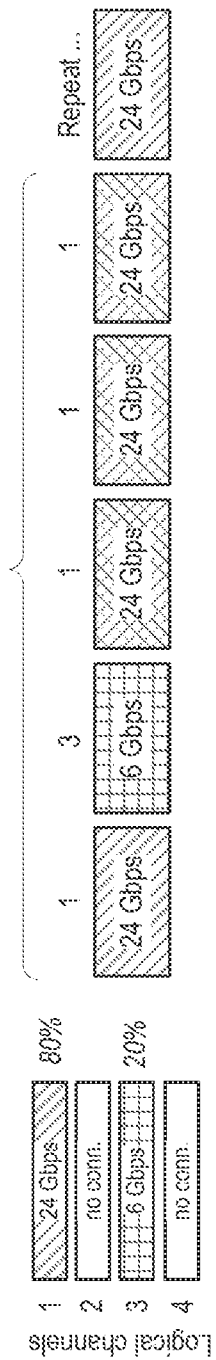
FIG. 13A
FIG. 13B
FIG. 13C

FRACTIONAL MULTIPLEXING OF SERIAL ATTACHED SMALL COMPUTER SYSTEM INTERFACE LINKS

CROSS REFERENCE TO RELATED APPLICATIONS

This application claims the benefit of priority of U.S. Provisional Patent Application No. 62/288,677 filed on Jan. 29, 2016, which is incorporated herein by reference.

FIELD

The present disclosure relates to Serial Attached Small Computer System Interface (SCSI), or SAS for short, storage interconnect technology including but not limited to time-division multiplexed speed aggregation techniques for SAS links.

BACKGROUND

In SAS, an initiator device is typically a host such as a computer, and a target device is typically a storage device such as a mechanical hard disk drive (HDD) or solid-state disk drive (SSD). SAS uses a connection-based protocol as opposed to packet-based protocol. SAS link layer protocol provides the means for SAS initiators and targets to request connection paths to each other. When a connection is active, the connected initiator and target devices can exchange frames that contain commands, data and status information. SAS expanders act as connection-based switches and facilitate connecting multiple SAS initiator and target devices to each other.

The SAS Protocol Layer 4 (SPL-4) standard generally defines a physical link as two differential signal pairs, one pair in each direction, that connect two physical PHYs. In addition, the standard generally defines a connection as a temporary association between a SAS initiator port and a SAS target port using a pathway. The terms link and connection, as used herein, are to be understood as consonant with that definition.

FIG. 1 shows a simple example configuration in an SAS system 100, comprising an initiator 102 connected to an expander 104 over an SAS link 110. The system 100 further comprises one or more target devices 106, such as disk drives, over one or more links 112.

Serial SCSI storage systems have evolved over four generations, and a key value is that legacy generation devices can interoperate with the latest generation protocol and link rates. SAS is a differential pair interface with an end-to-end connection protocol. The electrical characteristics are also defined for the transmitter and receiver PHY and serializer-deserializer (SERDES). Supported bit rates for SAS are shown below in Table 1.

TABLE 1

| SAS Generation | Electrical Link Bit-rate | Raw Data baud rate | SERDES coding |
| --- | --- | --- | --- |
| SAS-1 | 3.0 Gb/s | 2.4 Gb/s | 8b10b encoded |
| SAS-2 | 6.0 Gb/s | 4.8 Gb/s | |
| SAS-3 | 12.0 Gb/s | 9.6 Gb/s | |
| SAS-4 | 22.5 Gb/s | 19.2 Gb/s | 128b/150b packets |

SAS natively makes a single end-to-end connection over an available electrical link or channel. This becomes very inefficient when a SAS-4 link is used for a SAS-2 connection, where bandwidth utilization is just 6 Gb/s from a 22.5 Gb/s lane.

Bandwidth utilization is a challenge for the latest SAS-4 (22.5 Gb/s), and is generally expected to be a challenge in future faster SAS generations. A storage infrastructure that comprises a diverse range of high capacity storage devices may not be able to individually saturate the maximum possible link rate speed. Most SAS hard disk drive (HDD) devices are not expected to support faster than 12 Gb/s links, while Serial ATA (SATA) hard disk drives support 6 Gb/s as their fastest possible link rates. This means that an unmodified SAS storage infrastructure will run at low bandwidth utilization rates when operating in connections to those devices (i.e., 25% for 6 GB/s devices, 50% for 12 Gb/s devices). Existing HDD media read/write rates are much lower than this at around 200 MB/s. An inability to leverage the full capacity of the available bandwidth of the technology generally results in suboptimum system performance.

Improvements in SAS links are desirable.

SUMMARY

According to an aspect, the present disclosure is directed to a method in a Serial Attached SCSI (SAS) system, the method comprising establishing an SAS serial connection between an SAS initiator and an SAS expander over a physical link for communications between the SAS initiator and a plurality of target devices, the plurality of target devices being in communication with the SAS expander, and transmitting SAS packets associated with each of the plurality of target devices over the SAS connection, wherein the transmitting comprises dynamically multiplexing the SAS packets of each of the plurality of target devices over the SAS connection, and wherein each SAS packet comprises one or more information bits indicating the target device with which the SAS packet is associated.

In an embodiment, the dynamic multiplexing comprises scheduling the SAS packets associated with each of the target devices based at least partly on the number of target devices.

In an embodiment, the dynamic multiplexing comprises scheduling the SAS packets associated with each of the target devices based at least partly on the maximum physical link rate supported by each of the target devices.

In an embodiment, the scheduling of the SAS packets is performed according to a weighted round robin scheme where the weight assigned to SAS packets of each of the target devices is proportionally based on the maximum physical link rate supported by the respective target device.

In an embodiment, the transmitting the dynamically multiplexed SAS packets over the SAS connection comprises transmitting SAS packets associated with at least two target devices having different maximum physical link rates.

In an embodiment, the dynamically multiplexing the SAS packets comprises replacing an idle SAS packet associated with one of the target devices prior to transmission with an SAS packet associated with another of the target devices containing active data.

In an embodiment, the method further comprises transmitting non-SAS packets over the SAS connection, wherein the transmitting comprises dynamically multiplexing the SAS packets of each of the plurality of target devices and the non-SAS packets over the SAS connection.

In an embodiment, the multiplexing is time domain multiplexing.

According to an aspect, the present disclosure is directed to a Serial Attached SCSI (SAS) device comprising a memory, and a processor in communication with the memory, the processor configured to control the device to establish an SAS serial connection between an SAS initiator and an SAS expander over a physical link for communications between the SAS initiator and a plurality of target devices, the plurality of target devices in communication with the SAS expander, and transmit SAS packets associated with each of the plurality of target devices over the SAS connection, wherein the transmitting comprises dynamically multiplexing the SAS packets of each of the plurality of target devices over the SAS connection, and wherein each SAS packet comprises one or more information bits indicating the target device with which the SAS packet is associated.

In an embodiment, the dynamic multiplexing comprises scheduling the SAS packets associated with each of the target devices based at least partly on the number of target devices.

In an embodiment, the dynamic multiplexing comprises scheduling the SAS packets associated with each of the target devices based at least partly on the maximum physical link rate supported by each of the target devices.

In an embodiment, the scheduling of the SAS packets is performed according to a weighted round robin scheme where the weight assigned to SAS packets of each of the target devices is proportionally based on the maximum physical link rate supported by the respective target device.

In an embodiment, the dynamically multiplexed SAS packets transmitted over the SAS connection comprise SAS packets associated with at least two target devices having different maximum physical link rates.

In an embodiment, the dynamically multiplexing the SAS packets comprises replacing an idle SAS packet associated with one of the target devices prior to transmission with an SAS packet associated with another of the target devices containing active data.

In an embodiment, the processor is further configured to control the device to transmit non-SAS packets over the SAS connection, wherein the transmitting comprises dynamically multiplexing the SAS packets of each of the plurality of target devices and the non-SAS packets over the SAS connection.

In an embodiment, the multiplexing is time domain multiplexing.

In an embodiment, the SAS device is the SAS initiator.

In an embodiment, the SAS device is the SAS expander.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIGS. 13A, 13B and 13C are diagrams showing various FCM channel scheduling examples.

DETAILED DESCRIPTION

Figure 1:
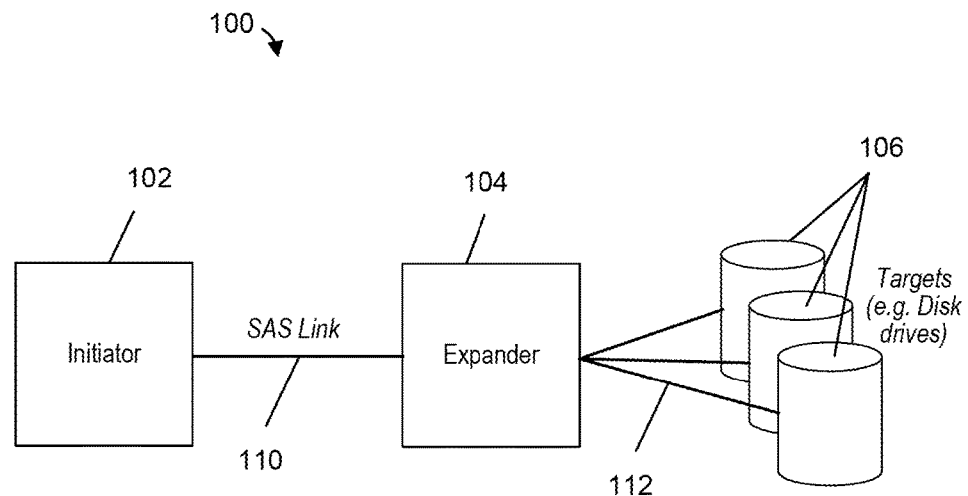
FIG. 1 is a block diagram of an example SAS system.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

An area of growing importance to SAS technology is the aggregation of data traffic sent through SAS expanders between SAS initiator (controller) devices, and SAS or Serial AT Attachment (SATA) target devices (e.g. disk drives) operating at different physical link rates.

An existing approach is a 2-to-1 time-division-multiplexed scheme, which is defined in the SAS-2 standard specification. Another approach is rate-matching buffers implemented in SAS expanders. However, both of these approaches suffer from one or more disadvantages.

Figure 2:
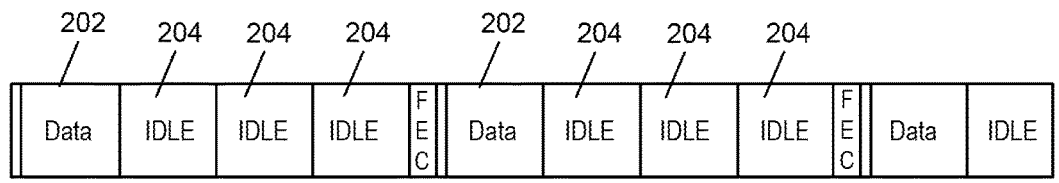
FIG. 2 is a diagram representing time slot allocation for a SAS-2 connection over a SAS-4 link.

Supported bit rates for SAS generations 1 to 4 were shown above in Table 1. SAS natively makes a single end-to-end connection over an available electrical link or channel. Again, this becomes very inefficient when a SAS-4 link is used for a SAS-2 connection, where bandwidth utilization is only about 25% (6 Gb/s over a 22.5 Gb/s lane). This is represented in FIG. 2, which shows only one time slot 202 of every four slots containing data, while the other three slots 204 are not utilized.

It may be valuable for any fabric to be able to leverage the full capacity of the available bandwidth of the technology to provide maximum system performance and/or provide a good return on investment for system implementers.

The challenges of creating a robust and flexible mechanism that is transparent to all other SAS components can require multiple specialized features. One possible challenge is to ensure that the SAS connections that are natively designed to operate as end-to-end connection protocol are able to operate independently from each other—and to operate transparently to a fractional channel multiplexing (FCM) process according to the present disclosure. This includes handling one or more of hot plug events, bit errors, retry events, credit and flow control as well as opening and closing connections transparently.

Accordingly, the present disclosure is directed to processes, devices and systems that utilize a higher speed link, such as a SAS-4 link, within a system that supports one or more lower bit-rates.

The present disclosure introduces traffic aggregation techniques that may provide advantages over the previous approaches.

In one aspect, the present disclosure is directed to a SAS initiator and a SAS expander that work together using the present traffic aggregation techniques to provide higher performance through better link utilization. The present teachings may be implemented in storage methods, devices, and systems based on the fourth generation SAS specification (SAS-4) and later standard specifications.

In an aspect, the present disclosure provides a system that negotiates a high bandwidth SAS connection, for example a SAS-4 connection, and then modifies the SERDES bit-mapping into a new packet format that supports multiple independent containers (e.g. time slots). The multiple independent containers are used to identify separate SAS logical connections. This may increase bandwidth utilization efficiency in SAS systems. Connections may be aggregated from multiple attached targets, such as storage devices, that each run at any bit rate.

In an aspect, the present disclosure provides fractional channel multiplexing (FCM) on a SAS link that yields an efficient and transparent method for bandwidth aggregation that is implemented within SAS Expander devices and SAS Host bus controller devices operating as SAS initiator devices.

In an aspect, the present disclosure is directed to techniques and devices that are interwoven with the SAS link layer of a SAS expander or a SAS host initiator in order to interoperate transparently for all attached SAS devices.

In an aspect, the present disclosure provides FCM, which involves the creation of a packetized channel that is multiplexed into several virtual lanes. Each lane may operate as a unique SAS connection.

Serial Attached SCSI (SAS) is a connection based protocol with protocol support for transactions operating over a single negotiated connection for each transaction. SAS is not a packet transport protocol. Rather, it is a protocol that uses dedicated connections (analogous to a telephone call).

In at least some embodiments, the SAS protocol is not changed. An FCM channel may behave as a set of multiple virtual SAS lanes that support standard commands, functions, error handling and management.

Figure 3:
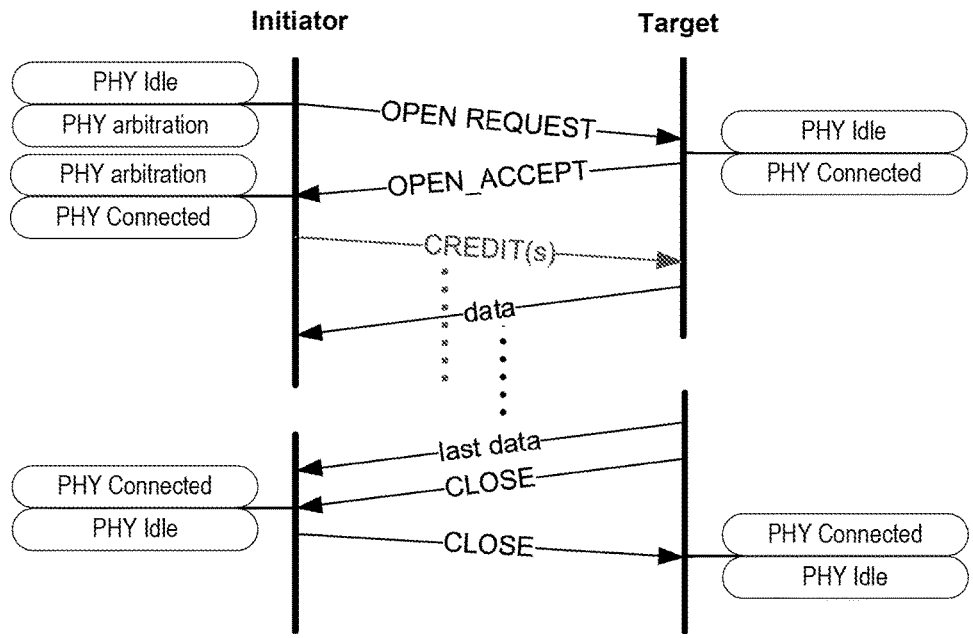
FIG. 3 is a data flow diagram showing a conceptual view of an example SAS connection request.

Standard SAS connectivity requests tenancy of a link through a handshaking mechanism that reports source and destination addresses so that large topologies can support routing and congestion management by expander devices that increase the scale of the infrastructure (analogous to a switch) device. FIG. 3 is a data flow diagram shows a conceptual view of an example SAS connection request between an initiator and a target device.

The SAS protocol uses OPEN address frames and other link layer control primitives to negotiate connection pathways from an end device through one or more expander devices to another end device. When a connection is negotiated the source and destination SAS addresses are defined for the connection, and while that connection is 'open' then all of the information exchanged is strictly between the initiator and target device pair that negotiated the connection. The connection time (link tenancy) is variable and allows for flow control and idle data periods while the connection is still in place.

The fractional channel multiplexing (FCM) of the present disclosure is generally interoperable with the standard SAS-4 protocol. FCM defines a secondary negotiation of the Link Layer to utilize the native link bit stream into a revised packet format.

Figure 4:
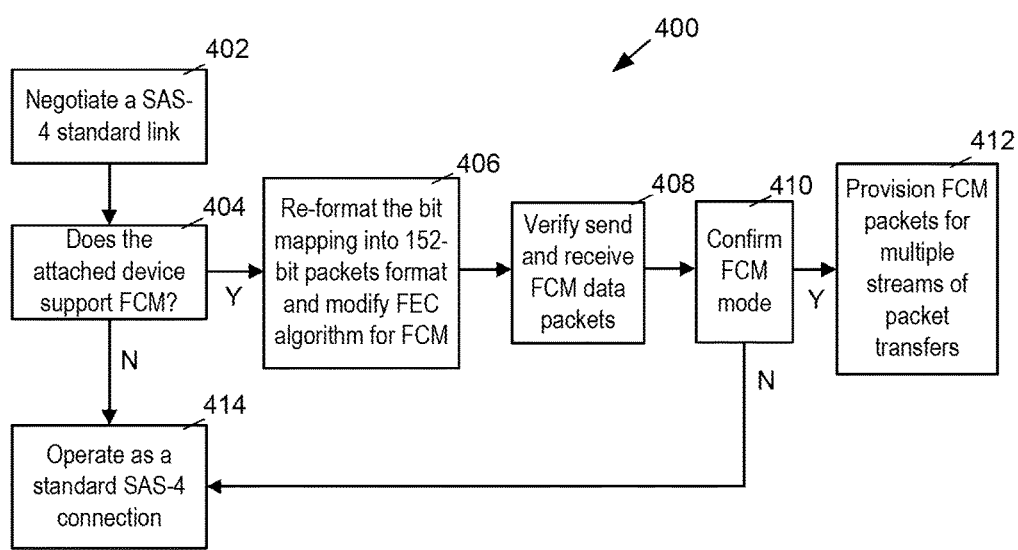
FIG. 4 is a process flow diagram representing a fractional channel multiplexing (FCM) negotiation in at least one embodiment.

FIG. 4 is a process flow diagram 400 representing a FCM negotiation in at least one embodiment. The initialization of an FCM connection starts with a fully SAS-4 compliant lane and adds a secondary stage of negotiation to support FCM.

Process 400 begins at block 402 and proceeds to block 404 where it is determined if the attached device supports FCM. If no, the process proceeds to block 414 where the connection may be operated as a standard SAS connection. If yes, the process proceeds to block 406 where the bit mapping is reformatted. For instance, the bit mapping may be reformatted into 152-bit packets and the forward error correction (FEC) algorithm may be modified for FCM. The process proceeds to block 408 where the sending and receiving of FCM packets is verified. The process proceeds to block 410 where the operation of FCM mode confirmed, or not. If FCM mode is confirmed, the process proceeds to block 412 where FCM packets may be provisioned for multiple streams of packet transfers. If FCM mode is not confirmed at block 410, the process proceeds to block 414 where the connection may be operated as a standard SAS connection.

SAS link negotiation already includes a mechanism to negotiate link parameters during the SNW-3 speed negotiation window. 32 PHY capabilities bits are exchanged. This exchange occurs before the links settle on a final link rate, spread spectrum behavior and multiplexed operating mode. The links use the "least common denominator" in deciding which modes to adopt. Accordingly, 15 reserved PHY capabilities bits exist. In an embodiment, at least one of the reserved bits may be used to request Fractional Channel Multiplexing (FCM) mode.

In SAS-3 and earlier, a SAS link exchanged 8b10b encoded dwords of data that defined the smallest level of information to be asserted onto the SAS link, defined as "SAS dword Mode" in the T10/BSR INCITS 538, Information technology—SAS Protocol Layer-4 (SPL-4), Revision 11, Jan. 12, 2017 document, referred to as SPL-4r11 herein, which is incorporated herein by reference. This document is a working document of T10, a Technical Committee of Accredited Standards Committee INCITS (International Committee for Information Technology Standards).

In SAS-4 the link encoding is changed to 128 bits of data that are encapsulated into a 150 bit SAS protocol layer (SPL) packet, defined as "SAS packet mode" in SPL-4r11. SPL packets are referred to herein simply as SAS packets.

Figure 5:
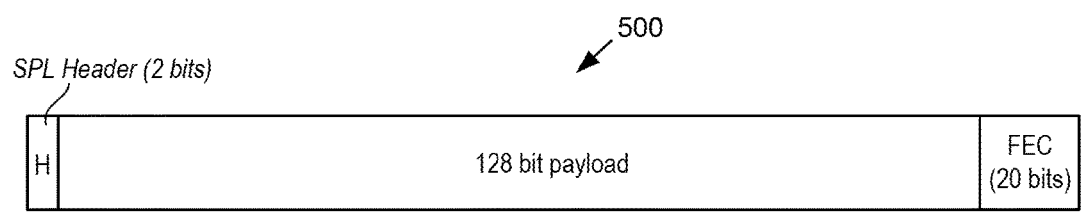
FIG. 5 is a representation of an SAS-4 packet format.

FIG. 5 shows an SAS-4 packet format 500. As shown, the packet comprises a 2-bit header, a 128 bit payload, and a 20 bit forward error correction (FEC) to give a 128b150b packet (a 128 bit payload, and 22 bits for the SPL header and FEC). A 19.2 Gb/s data baud rate results in a 22.5 Gb/s line rate, which includes header and FEC overhead. Reed-Solomon FEC increases reliability and permits higher channel losses to enable similar cable and backplane routing lengths comparable with SAS-3 while retaining better than $10e^{-15}$ bit error rate (BER) (defined in SAS-4).

Figure 6:
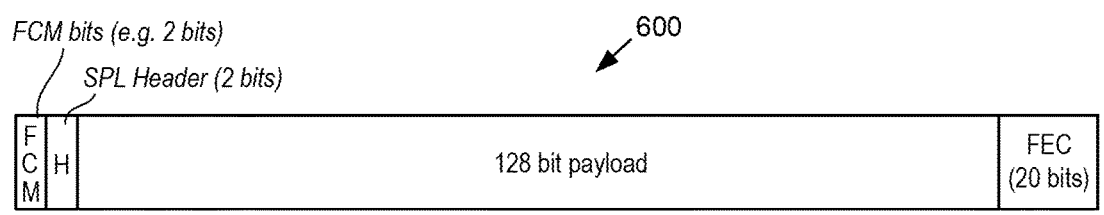
FIG. 6 is a representation of an SAS-4 packet format in at least one embodiment comprising an FCM field.

According to the present disclosure, an SAS packet may be modified to add additional FCM bits that identify the packet affiliation. FIG. 6 shows a non-limiting embodiment in which an FCM packet 600 has 2 FCM bits. However smaller and larger FCM bit fields are also contemplated to allow for fewer or more virtual lanes, as appropriate for the traffic profile.

Thus information bits may be added to a SAS packet to indicate to which channel the packet belongs out of several logical multiplexed channels over the physical link. The information bits may be referred to as FCM bits.

In addition, a forward error correction (FEC) algorithm may be changed to support protection of the extended fields e.g., 132 bits payload instead of 130 bits payload.

According, in at least some embodiments, rather than a connection being established and torn down for each communication between the initiator and a given target over the physical SAS link, a single connection may be used for data communications for a plurality of targets (e.g. disk drives, etc.). Each disk drive operates in a unique link layer. Data affiliated with a particular disk drive may be packed into one or more FCM packets and sent over the shared connection. FCM multiplexes the available egress packets onto the FCM channel in any suitable order controlled by the multiplexing link layer. In an embodiment, the FCM multiplexing may be performed in a manner that attempts to ensure balanced throughput. In this way, FCM packets from different disk drives may be interleaved over the single physical link and sent at up to the maximum link rate of the primary physical link. Data interleaving may thus be done on a packet-by-packet basis. The term interleaving is generally used herein to mean multiplexing.

Figure 7:
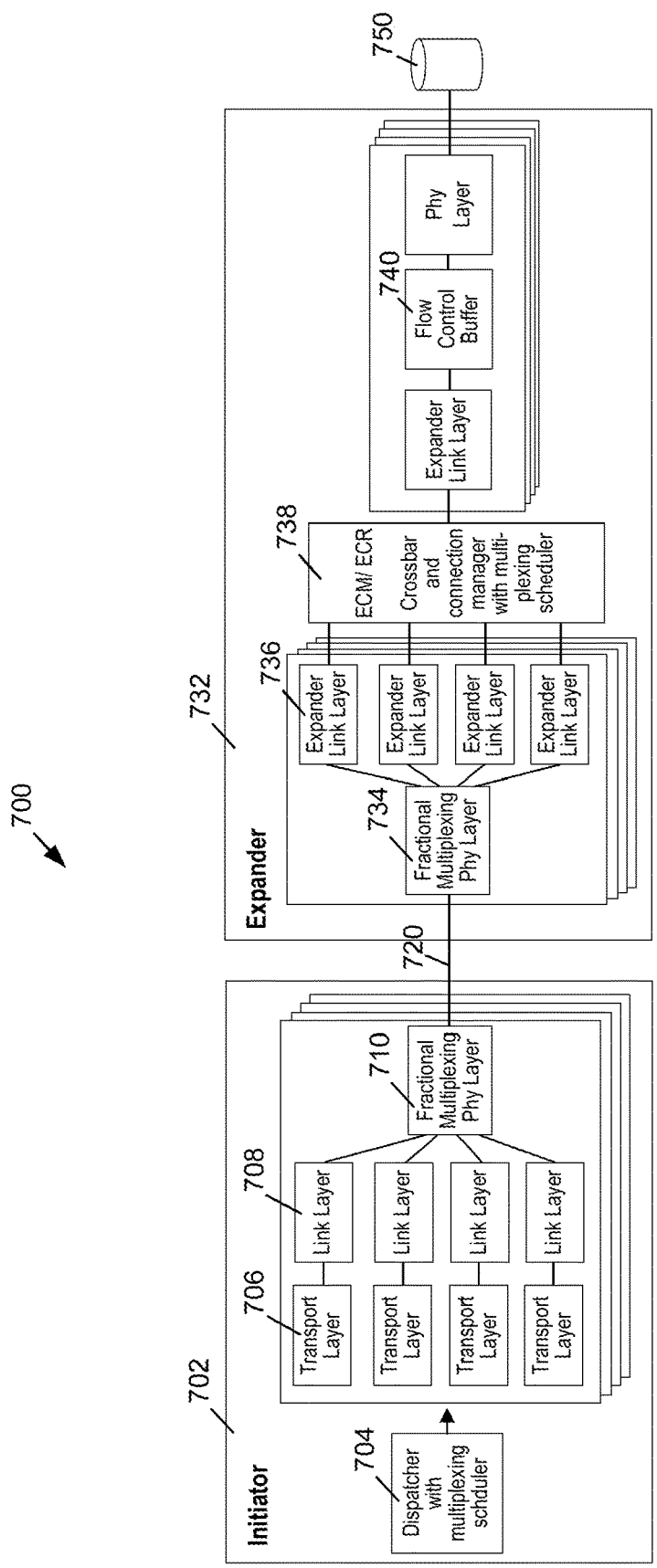
FIG. 7 is an example architectural model block diagram in at least one embodiment for an FCM.

Each FCM packet can be allocated to carry information that is affiliated to a particular virtual SAS connection. The FCM bits indicate the packet affiliation, so that the payload is directed to the appropriate link layer. FIG. 7 shows an example architectural model block diagram of a system 700 in at least one embodiment for an FCM that supports up to four independent links operating on a single FCM. Fractional multiplexing utilization may be determined by the FCM bits, and not necessarily by any alternating packet sequence or any time factors.

In an embodiment, FCM multiplexes the packet source and destination into unique link layer functions. The FCM bits define which link layer each packet is directed to. Each virtual link layer operates as a unique SAS lane. Any device may issue an SPL OPEN ADDRESS FRAME on any of the available virtual lanes on the FCM channel, independent of the device bit rate. The SAS connection is negotiated using standard SAS protocol. FCM multiplexes the available egress packets onto the FCM channel in any order controlled by the multiplexing link layer to ensure balanced throughput.

The system 700 of FIG. 7 comprises an initiator 702 connected to an expander 732 over a physical link 720. Expander 732 is connected to one or more target devices 750. Initiator 702 comprises a dispatcher 704 with a multiplexer scheduler. Multiple transport layer 706 and link layer 708 pairs are also shown. Multiple corresponding expander link layers 736 are shown in expander 732. In this embodiment, there are 4 link layers corresponding to 4 virtual lanes. A scheduling function in the dispatcher 704 and in the expander connection manager (ECM) 738 allocates outgoing connection requests to available logical channels. The allocating of connection requests may be based on load balancing decisions. In an embodiment, a weighted round-robin multiplexer in the initiator fractional multiplexing PHY layer 710 and expander fractional multiplexing PHY layer 734 multiplexes traffic from multiple logical channels in fractional ratios for transmission over the physical link based on some criteria. An example criterion is the connection rates requested. A requested rate may be the maximum physical connection rate of a target device. In addition, a flow control buffer 740 may be used for Serial SCSI Protocol (SSP) traffic to prevent channel overrun. Flow control buffer 740 manages data flow from the target 750 to prevent overrunning the "fractional" (i.e. reduced capacity) data channel back to the initiator 702. Serial tunneling protocol (STP) flow control is not changed. SSP flow control generally needs to have enough buffer depth to absorb the maximum number of credits issued by the initiator. Control logic tracks and throttles credits issued by the target and initiator.

Figure 8:
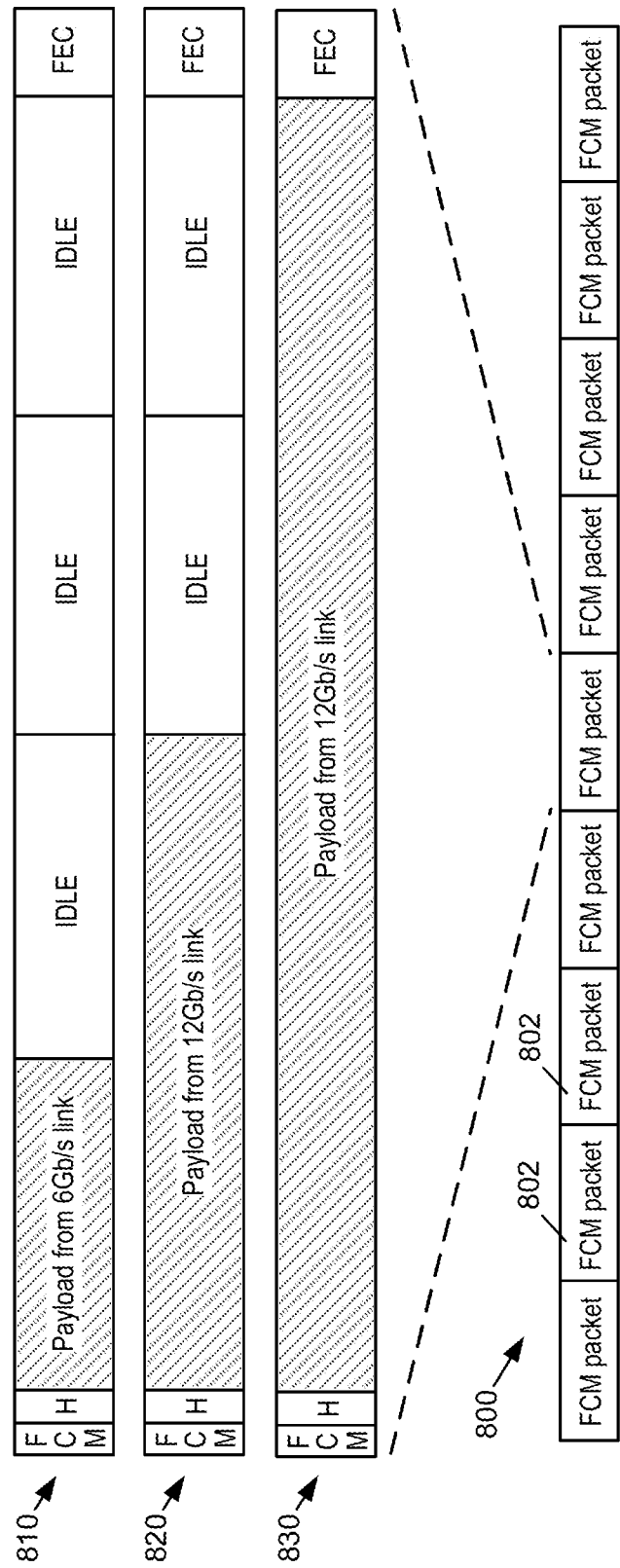
FIG. 8 is a diagram representing an example FCM channel consisting of continuous packets.

FIG. 8 shows an example FCM channel 800 comprising a multiplexed stream of packets 802. Any packet in the stream may be utilized by any of the virtual SAS connections. FIG. 8 also shows three different example packets 810, 820, 830 in the multiplexed stream of FCM packets 802, i.e. packets 802 may be instances of any of packets 810, 820 or 830. Packet 810 comprises a payload of 32 bits from a 6 Gb/s link. Packet 820 comprises a payload of 64 bits from a 12 Gb/s link. Packet 830 comprises a 128 bit payload from a 12 Gb/s link. The multiplexed stream of packets allows the fractional multiplexing PHY layer to manage congestion and optimize bandwidth utilization with the available data.

Figure 9:
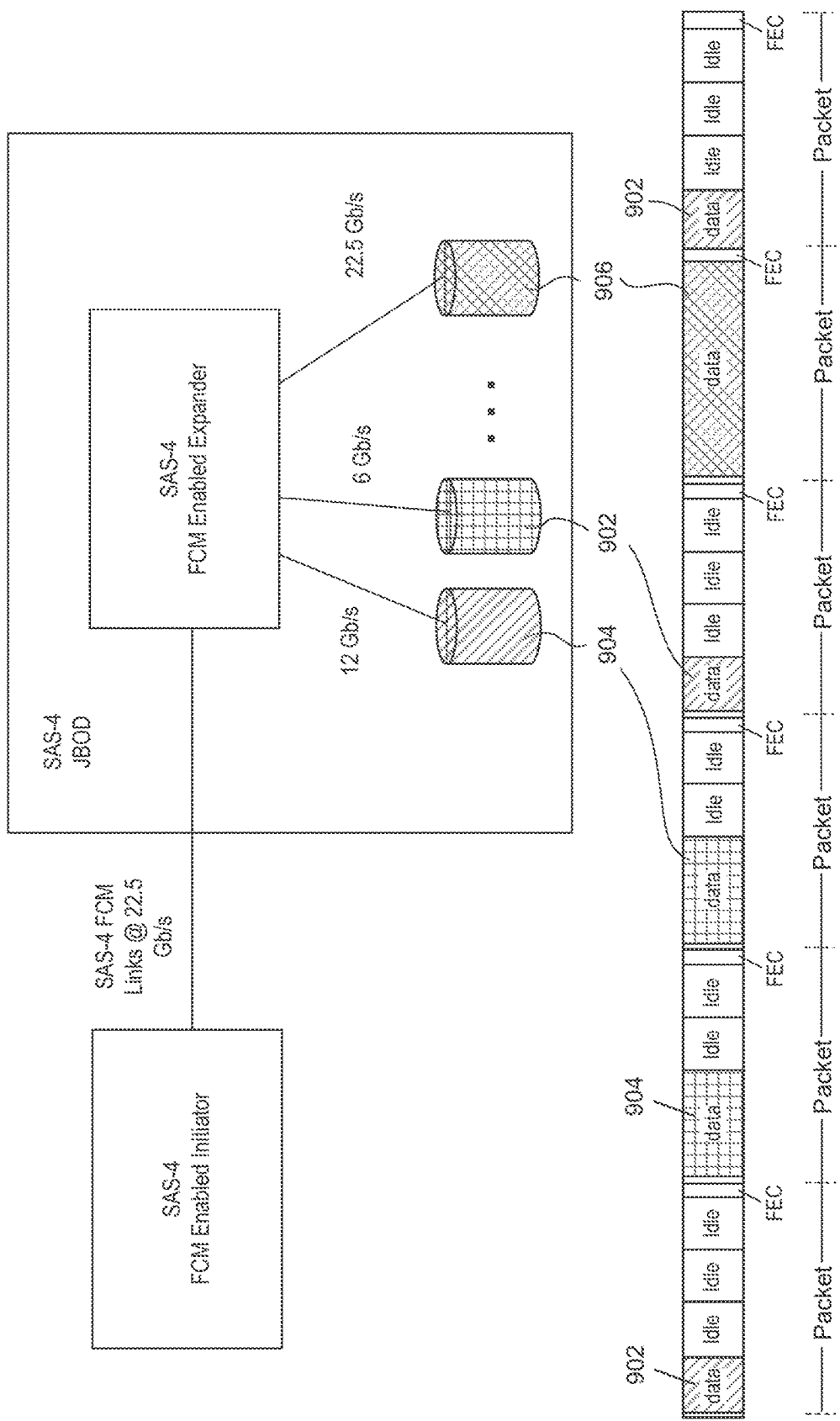
FIG. 9 is a diagram showing an example embodiment in which three different connections utilize an FCM channel.

FIG. 9 shows an example of three different connections utilizing an FCM channel. Data 902 is associated with a 6 Gb/s connection, data 904 is associated with a 12 Gb/s connection and data 906 is associated with a 22.5 Gb/s. The order that the packets are multiplexed onto the channel may be defined by a fractional multiplexing PHY layer that operates an algorithm for multiplexing based on one or more parameters including but not limited to, for example, the availability of data, priority of the connection, status of the ingress and egress buffers and outstanding connection requests. In this example, the expander is able to service 3 connections on a single FCM physical link with the connection rates shown in the example, but the overall bandwidth capacity of the 22.5 Gbps physical link has not been exceeded.

Arbitration of the channel multiplexing to optimize utilization may be managed by a fairness algorithm that evaluates one or more of traffic profiles, negotiated prioritization, end device characteristics and congestion. The optimal algorithm may vary for different system implementation and applications.

Figure 10:
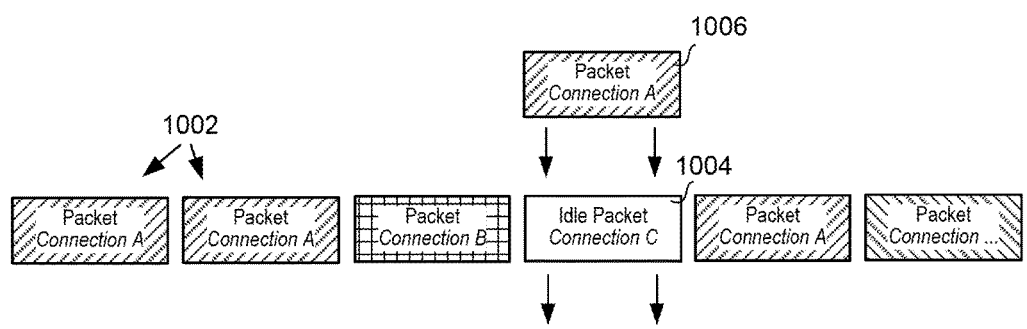
FIG. 10 is a diagram showing another example embodiment in which an idle SAS packet associated with one target device is replaced with an SAS packet associated with another target device.

According to another aspect of the present disclosure, multiplexing may be implemented by recognizing idle SAS packets of a first connection (i.e. logical link) and replacing them with SAS packets containing active data for another connection (i.e. logical link) to increase the utilization of the physical link. The term idle SAS packet generally refers to a packet that does not contain any active data. Thus, for example, an SAS packet of a connection may be scheduled for transmission but the packet may be idle thereby wasting utilization of the physical link. The idle packets may be re-applied by the link layer of each connection, so that the SAS layer for each connection is unchanged from its native form when processed by the SAS link layer. FIG. 10 is an example representation of a queue of several packets 1002 to be transmitted showing how an idle packet 1004 associated with one connection (e.g. associated with one target device) may be replaced with a packet 1006 containing active data associated with another connection (e.g. associated with another target device).

Furthermore, flow control may be a modified version of the standard SAS protocol to support packetized transfers that previously would have been managed over dedicated link transfers. In an embodiment, buffering of data at the transmitter and receiver SERDES may be used to optimize FCM and assist when multiple different connection rates are being transported.

According to another aspect of the present disclosure, an additional layer of channel multiplexing may be embedded within any discrete logical link. In an embodiment, two or more logical links may be statically multiplexed within an FCM channel. In an embodiment, this additional multiplexing layer may be analogous to the legacy link SAS multiplexing scheme introduced into SAS-2, which is a static 2:1 multiplexing scheme. This static 2:1 multiplexing involves the interleaving of dwords that divides a single physical link into two logical links by creating two logical phys from a single physical phy. This is separate from dynamically multiplexing packets associated with different target devices on the physical link as previously described.

The present disclosure may be used to optimize SAS performance and bandwidth utilization. However, it is also contemplated that the teachings of the present disclosure may be used with or applied to other protocols to be transported over the SAS fabric using FCM. Essentially, FCM creates virtual channels and the FCM multiplexing header bit(s) enable packets to be multiplexed between other protocol link layers such as, but not limited to, Peripheral Component Interconnect Express (PCIe), Non-Volatile Memory Express (NVMe), Ethernet, Remote Direct Memory Access over Converged Ethernet (RoCE), iSCSI Extensions for RDMA (iSER), internet Wde Area RDMA Protocol (iWARP), Fibre Channel, and others. Furthermore, various embodiments are described as being implemented using SAS-4 but this is not meant to be limiting.

Changing the format of the packets used by SAS into a different format may mean that standard test equipment may not be able to analyze the data on the FCM link. According to an aspect of the present disclosure, port mirroring may be used as a method for FCM links to be diagnosed, snooped and analyzed.

Figure 11:
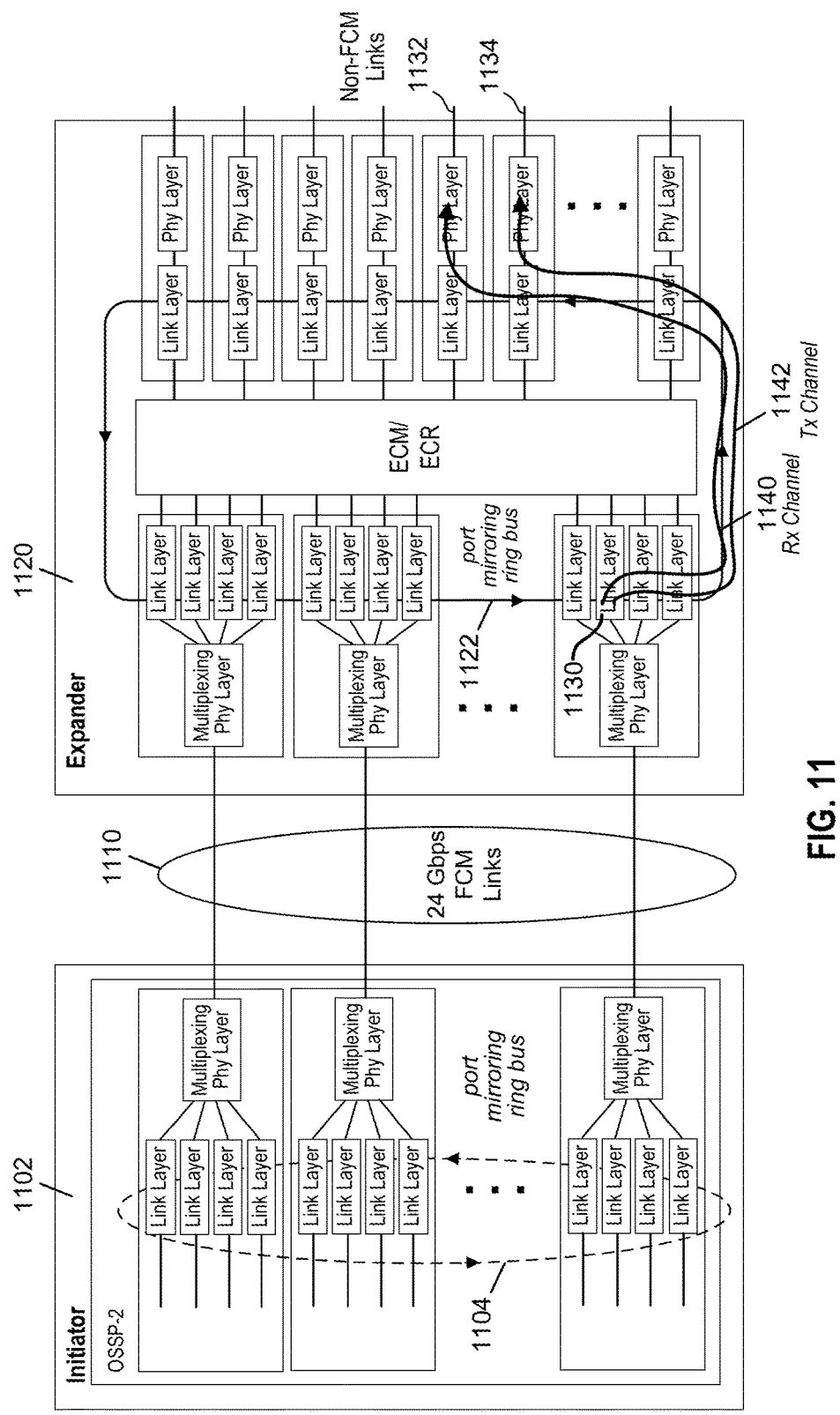
FIG. 11 is a diagram illustrating an example of port mirroring being used to observe FCM connection data in its native SAS format.

In an embodiment, port mirroring replicates the data at the FCM link layer receiver, and transmits the native format of the SAS (or other protocol) on a different SERDES of the device. The data on the mirrored link is a replica of the data processed by the FCM link layer. FIG. 11 is a diagram illustrating an example of port mirroring being used to observe FCM connection data in its native SAS format. FIG. 11 shows an initiator device 1102 supporting FCM links 1110 that connect to a SAS Expander 1120. Initiator comprises a port mirroring ring bus 1104 while expander 1120 also comprises a port mirroring ring bus 1122. The expander 1120 "mirrors" the received SAS ports onto two other ports that can be used to observe the FCM channel data for each FCM connection. The port mirroring ring bus 1122 of expander 1120 allows any logical PHY including FCM channels to be routed out to a pair of physical channels. An example is shown in FIG. 11 where a logical channel 1130 corresponding to a single link layer is routed to a pair of physical channels 1132 and 1134 over an Rx channel 1140 and a Tx channel 1142. A protocol analyzer may be used to observe a SAS-4 compliant data stream at the pair of physical channels 1132 and 1134.

Figure 12:
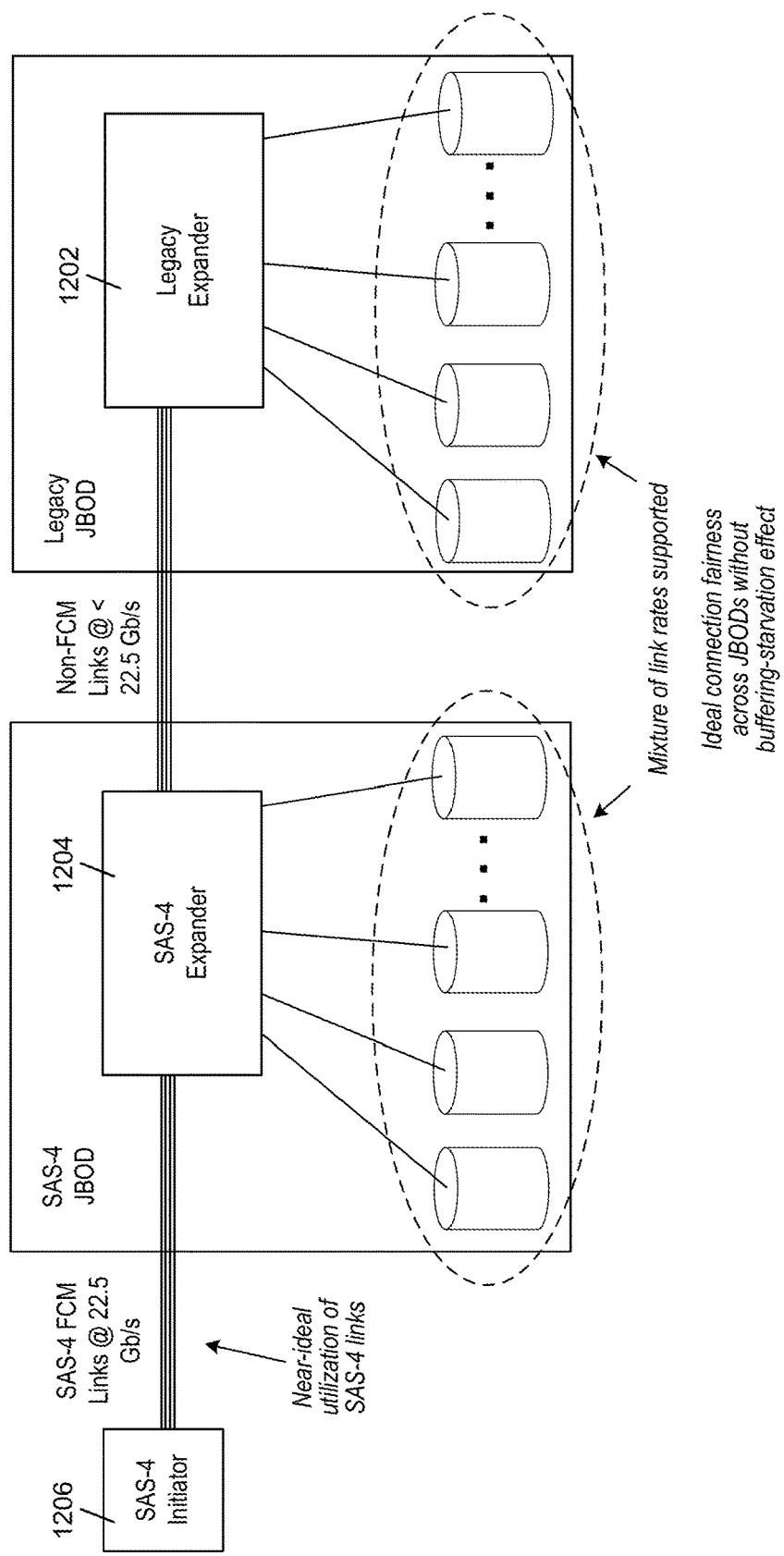
FIG. 12 is a diagram showing an example topology with both legacy and FCM enabled devices.

In various embodiments, the FCM of the present disclosure is interoperable with legacy devices and other devices that do not support FCM. FIG. 12 is a diagram showing an example topology with a legacy expander 1202 attached to an FCM enabled expander 1204 and an FCM enabled initiator 1206. Connections for the legacy expander 1202 may utilize the FCM channels in exactly the same way as any device attached to the FCM expander. Each virtualized SAS lane participates in standard SAS connections, with the benefit that any unused available bandwidth can be used by other virtual connections.

In an embodiment, all devices in a mixed FCM/non-FCM domain use their own buffers and connection management, therefore there may be no expander-based buffering starvation effect that results from large data buffers in target devices competing unfairly with small rate-matching data buffers in expander devices. In addition, the FCM links may provide a wider effective port than the non-FCM links, but the same SAS fairness algorithm may be used throughout the domain.

Further aspects and features of the present disclosure are described below.

According to one aspect, in some embodiments, additional bits are added to the 130/150b standard SAS-4 packet to label each SAS-4 packet with a new identifier. A mode with additional bits provides a non-blocking method for carrying multiple logical connections or different protocol types simultaneously where each packet is tagged with the logical channel identifier. The number of FCM bits for multiplexing support may be any number. Examples in the present disclosure use 2 bits, but this is not limiting. A 132 bit payload within a 152 bit total packet (132/152b) provides nearly the same bit error rate (BER) as the standardized 130/150b code used in SAS-4. Links may be negotiated after identifying the device and FCM capabilities reported in the vendor specific field of the SAS IDENTIFY frame exchanged during standard SAS speed negotiation. The scheme is not necessarily dependent on a 132/152b code and/or exactly 2 additional bits in the SAS-4 packet; the number of additional bits sets the number of logical links available which may be more or less than 4.

According to an aspect, in some embodiments, a time-division multiplexing scheme for SAS links uses a dynamically allocated, fractional amount of data for each logical PHY carried on the same physical link. A new scheduling function in the dispatcher of the initiator and the ECM of the expander allocates outgoing connection requests to available logical links and sets the FCM bits appropriately. A new weighted round-robin multiplexer in the initiator and expander PHY Layer mixes connection traffic from multiple logical links in fractional ratios based on criteria specific to the application of the system. An example criterion may be to base the fractional traffic ratios on the relative ratios of the connection rates for all of the active connections. Other criteria such as connection priority may be used to select the traffic ratio for each logical connection. A new flow control buffer may be used for SSP traffic to prevent physical link capacity overrun. The flow control buffer may absorb any short term traffic imbalance when a SAS target which does not implement a fractional multiplexing scheme according to the present disclosure sends more SAS-4 packets than the physical link has immediate capacity to carry. Logic associated with the flow control buffer may limit the forwarding of SAS frame credits (RRDY primitives) from the initiator to the target so that no more credit is provided to the target device than the flow control buffer has capacity to absorb. SAS-4 Idle packets from one logical link may be replaced with useful data and primitives from other logical links to increase the utilization of the physical link.

According to an aspect, in some embodiments, SAS-4 packets may be interleaved with packets that carry non-SAS data protocols. The previously described identifier provided by additional bits added to the SAS-4 packet can be used to identify non-SAS traffic types. The previously described flow control buffer may enable the quantity of SAS-4 traffic to be reduced to provide capacity for non-SAS packets.

While SAS is a full-duplex protocol, data is often only transmitted in one direction during a connection. This means that significant additional unused bandwidth can be reused if Idle Packets are retasked for use by other FCM logical links. SATA is a half-duplex protocol with extensive hand-shaking overhead, so this technique may roughly double the capacity of SAS links that carry SATA (STP) protocol.

The present disclosure also includes packing data associated with a specific disk drive into one or more packets, and interleaving the one or more packets with packets associated with other disk drives over a physical link between an initiator and an expander. The present disclosure further includes adding a new field to a SAS packet to identify which logical channel the packet belongs. The present disclosure further includes allocating time in a SAS time division multiplexing configuration based on the requested connection rate (e.g. 1.5 Gbps, 3 Gbps, etc.).

FIGS. 13A-C shows three FCM channel scheduling examples, respectively. In the examples, SAS packets are interleaved from the logical channels onto the physical channel using a weighted round-robin scheme where the weights determined by or based on the connection rate of each logical channel. An example weighting used in the round robin scheme is shown at the right side of FIG. 13A.

The first example of FIG. 13A has 4 6-Gbps devices each allocated one of the four logical channels. Each logical channel is allocated one packet in an alternating fashion since each channel has the same weighting factor of '1'. The weightings for the packets of each logical channel are therefore equal, namely 1/4, 1/4, 1/4 and 1/4. The time division multiplexing is shown on the right side, showing the packets interleaved in time. The numbers above the packets indicate the channel with which the packet is associated. In this example, the 24 Gb/s physical link is 100% provisioned since all of the connection bandwidth has been allocated (4×6 Gb/s=24 Gb/s).

The second example of FIG. 13B shows 3 devices, namely 2 6-Gbps devices and a 12-Gbps device. The 12-Gbps device is allocated every second packet since its weighting factor is twice that of the other two 6-Gbps devices. The weightings are therefore 2/4, 1/4 and 1/4. In this example, the 24 Gb/s physical link is also 100% provisioned.

The third example of FIG. 13C shows two devices, namely a 6-Gbps device and a 24-Gbps device. The 24-Gbps device is allocated four out of every five packets since its weighting factor is 4 times that of the 6-Gbps device. Unlike the previous two examples, here the allocation of packets is repeated every 5 packets instead of every four packets to accommodate the weightings of 4 and 1 (totaling 5). The weightings are therefore 4/5 for the 24-Gbps device and 1/5 for the 6-Gbps device. In this example, the 24 Gb/s physical link is overprovisioned by 20%. The term overprovisioned means that the sum of the connection rates for each active connection on a FCM link exceeds the physical link rate of the FCM link. In this example, the sum of the connection rates is 30 Gb/s (24+6) but the FCM link rate is only 24 Gb/s. The 6 Gb/s device gets 1/5 of the 24 Gb/s physical link, which is about 4.8 Gb/s instead of 6 Gb/s. Similarly, the 24 Gb/s device only gets 4/5 of the 24 Gb/s physical link, which is about 19.2 Gb/s instead of 24 Gb/s.

Thus as illustrated with the previous examples, SAS packets may be dynamically multiplexed from the logical channels onto the physical channel using a weighted round-robin scheme where the weights are proportional to or at least proportionally based on maximum physical link rates of the logical channels.

Again, FIGS. 13A-C merely show some FCM scheduling examples. In some embodiments, the allocation or scheduling function may be at least a partially soft such that different algorithms may have different benefit tradeoffs, such as bandwidth versus latency. Soft in this context means the allocation or scheduling function is defined in software. Accordingly, a chosen scheduling function may be dynamically changed depending on the application of the storage system.

In an embodiment, a connection request may be handled as follows. Select a PHY in which a connection request would bring the physical capacity of a PHY to almost or exactly 100%. Else, select a PHY that already has a logical connection but has capacity for the requested connection. Else, select a PHY with no existing connection. Else, optionally select a PHY that would result in overprovisioning by up to n %. However, this is merely an example and is not meant to be limiting.

A potential benefit of overprovisioning is to reduce the latency of delivering data. This may be achieved by allowing one or more connections to proceed that otherwise would have had to wait for link resources to become available. A potential penalty of overprovisioning is a proportional bandwidth reduction of all connections carried by the FCM link. However, the latency benefit may outweigh the bandwidth reduction penalty. Also, the bandwidth reduction may be offset somewhat by the utilization inefficiency of the connected devices.

The present disclosure is therefore directed to dynamic time-domain packet-by-packet interleaving of data associated with different logical channels over a single SAS connection over the physical link. An additional field may be added to the packet to identify which packets are associated with which logical channels over the single SAS connection. The allocation of packets in the time-division multiplexing may be performed dynamically. The time-division multiplexing may be based on any suitable criterion or criteria, including but not limited to one or more of the number of received requests (e.g. number of target devices) and on the requested connection rates.

Although the present disclosure is described with reference to SAS protocols and technologies, this is not intended to be limiting. The teachings of the present disclosure are intended to apply to other protocols and technologies.

Figure 14:
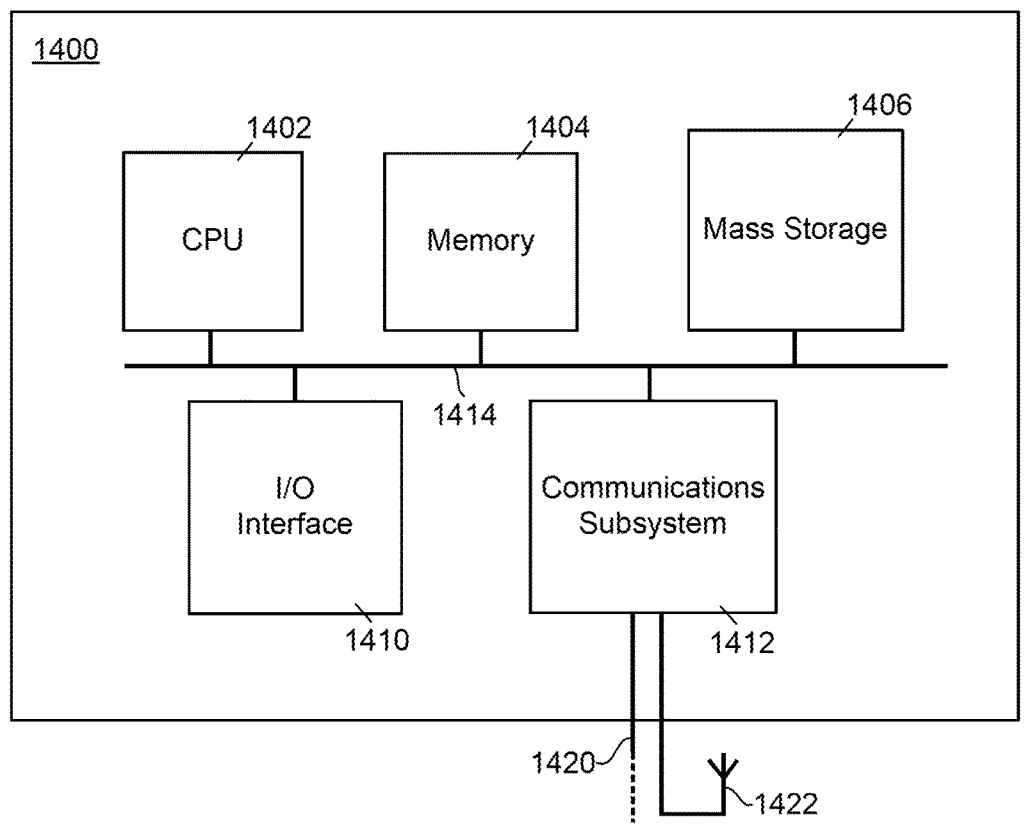
FIG. 14 is a block diagram of an example electronic device.

FIG. 14 is a block diagram of an example electronic device 1400 that may be used in implementing one or more components, features, or aspects of an embodiment according to the present disclosure. For example, one or both of an SAS initiator device and an SAS expander device according to the present disclosure may be implemented using electronic device 1400.

The electronic device 1400 may include one or more of a central processing unit (CPU) 1402, memory 1404, a mass storage device 1406, an input/output (I/O) interface 1410, and a communications subsystem 1412. One or more of the components or subsystems of electronic device 1400 may be interconnected by way of one or more buses 1414 or in any other suitable manner.

The bus 1414 may be one or more of any type of several bus architectures including a memory bus, storage bus, memory controller bus, peripheral bus, or the like. The CPU 1402 may comprise any type of electronic data processor. The memory 1404 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1406 may comprise any type of storage device configured to store data, software programs or other code, and other information and to make the data, programs, and other information accessible via the bus 1414. The mass storage device 1406 may comprise one or more of a solid state drive, hard disk drive, a magnetic disk drive, an optical disk drive, or the like. In some embodiments, data, programs, or other information may be stored remotely, for example in the "cloud". Electronic device 1400 may send or receive information to the remote storage in any suitable way, including via communications subsystem 1412 over a network or other data communication medium.

The I/O interface 1410 may provide interfaces to couple one or more other devices (not shown) to the electronic device 1400. Furthermore, additional or fewer interfaces may be utilized. For example, one or more serial interfaces such as Universal Serial Bus (USB) (not shown) may be provided.

A communications subsystem 1412 may be provided for one or both of transmitting and receiving signals. Communications subsystems may include any component or collection of components for enabling communications over one or more wired and wireless interfaces. These interfaces may include but are not limited to USB, Ethernet, high-definition multimedia interface (HDMI), Firewire (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, dedicated short range communication (DSRC), and IEEE 802.11. Communication subsystem 1412 may include one or more ports or other components 1420 for one or more wired connections. Additionally or alternatively, communication subsystem 1412 may include one or more of a transmitter (not shown), a receiver (not shown), and an antenna element 1422.

The electronic device 1400 of FIG. 14 is merely an example and is not meant to be limiting. Various embodiments may utilize some or all of the components shown or described. Some embodiments may use other components not shown or described but known to persons skilled in the art.

The present disclosure, including aspects relating to fractional channel multiplexing (FCM), has been described with reference to example embodiments related to mass storage interconnect technologies. However, this is not meant to be limiting. The teachings of the present disclosure may be used in any other suitable technologies, including packetized bus interconnect technology or networking technology.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method in a Serial Attached SCSI (SAS) system, the method comprising:
 establishing an SAS serial connection between an SAS initiator and an SAS expander over a physical link for communications between the SAS initiator and a plurality of target devices, the plurality of target devices being in communication with the SAS expander; and
 transmitting SAS packets associated with each of the plurality of target devices over the SAS connection, wherein the transmitting comprises dynamically multiplexing the SAS packets of each of the plurality of target devices over the SAS connection, and wherein each SAS packet comprises one or more information bits indicating the target device with which the SAS packet is associated,
 wherein the dynamic multiplexing comprises scheduling the SAS packets associated with each of the target devices according to a weighted round robin scheme where the weight assigned to SAS packets of each of the target devices is proportionally based on the maximum physical link rate supported by the respective target device.

2. The method of claim 1, wherein the dynamic multiplexing comprises scheduling the SAS packets associated with each of the target devices based at least partly on the number of target devices.

3. The method of claim 1, wherein the transmitting the dynamically multiplexed SAS packets over the SAS connection comprises transmitting SAS packets associated with at least two target devices having different maximum physical link rates.

4. The method of claim 1, wherein the dynamically multiplexing the SAS packets comprises replacing an idle SAS packet associated with one of the target devices prior to transmission with an SAS packet associated with another of the target devices containing active data.

5. The method of claim 1, further comprising transmitting non-SAS packets over the SAS connection, wherein the transmitting comprises dynamically multiplexing the SAS packets of each of the plurality of target devices and the non-SAS packets over the SAS connection.

6. The method of claim 1, wherein the multiplexing is time domain multiplexing.

7. A Serial Attached SCSI (SAS) device comprising:
a memory; and
a processor in communication with the memory, the processor configured to control the device to:
  establish an SAS serial connection between an SAS initiator and an SAS expander over a physical link for communications between the SAS initiator and a plurality of target devices, the plurality of target devices in communication with the SAS expander; and
  transmit SAS packets associated with each of the plurality of target devices over the SAS connection, wherein the transmitting comprises dynamically multiplexing the SAS packets of each of the plurality of target devices over the SAS connection, and wherein each SAS packet comprises one or more information bits indicating the target device with which the SAS packet is associated,
  wherein the dynamic multiplexing comprises scheduling the SAS packets associated with each of the target devices according to a weighted round robin scheme where the weight assigned to SAS packets of each of the target devices is proportionally based on the maximum physical link rate supported by the respective target device.

8. The SAS device of claim 7, wherein the dynamic multiplexing comprises scheduling the SAS packets associated with each of the target devices based at least partly on the number of target devices.

9. The SAS device of claim 7, wherein the dynamically multiplexed SAS packets transmitted over the SAS connection comprise SAS packets associated with at least two target devices having different maximum physical link rates.

10. The SAS device of claim 7, wherein the dynamically multiplexing the SAS packets comprises replacing an idle SAS packet associated with one of the target devices prior to transmission with an SAS packet associated with another of the target devices containing active data.

11. The SAS device of claim 7, wherein the processor is further configured to control the device to transmit non-SAS packets over the SAS connection, wherein the transmitting comprises dynamically multiplexing the SAS packets of each of the plurality of target devices and the non-SAS packets over the SAS connection.

12. The SAS device of claim 7, wherein the multiplexing is time domain multiplexing.

13. The SAS device of claim 7, wherein the SAS device is the SAS initiator.

14. The SAS device of claim 7, wherein the SAS device is the SAS expander.

15. A Serial Attached SCSI (SAS) system comprising:
means for establishing an SAS serial connection between an SAS initiator and an SAS expander over a physical link for communications between the SAS initiator and a plurality of target devices, the plurality of target devices being in communication with the SAS expander; and
means for transmitting SAS packets associated with each of the plurality of target devices over the SAS connection, wherein the transmitting comprises dynamically multiplexing the SAS packets of each of the plurality of target devices over the SAS connection, and wherein each SAS packet comprises one or more information bits indicating the target device with which the SAS packet is associated,
wherein the dynamic multiplexing comprises scheduling the SAS packets associated with each of the target devices according to a weighted round robin scheme where the weight assigned to SAS packets of each of the target devices is proportionally based on the maximum physical link rate supported by the respective target device.

* * * * *